(12) United States Patent
Correll, Jr.

(10) Patent No.: US 11,262,791 B2
(45) Date of Patent: *Mar. 1, 2022

(54) ELECTRONIC DEVICE COMBINATION

(71) Applicant: Correll Electronics, LLC, Winchester, VA (US)

(72) Inventor: Carroll Boston Correll, Jr., Winchester, VA (US)

(73) Assignee: CORRELL ELECTRONICS, LLC, Winchester, VA (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/428,721

(22) Filed: May 31, 2019

(65) Prior Publication Data

US 2019/0286191 A1  Sep. 19, 2019

Related U.S. Application Data

(63) Continuation-in-part of application No. 15/947,296, filed on Apr. 6, 2018, now abandoned, which is a
(Continued)

(51) Int. Cl.
*G06F 1/16* (2006.01)
*H04M 1/02* (2006.01)
*H04M 1/72409* (2021.01)

(52) U.S. Cl.
CPC .......... *G06F 1/1607* (2013.01); *G06F 1/1626* (2013.01); *G06F 1/1632* (2013.01);
(Continued)

(58) Field of Classification Search
CPC .... G06F 1/1607; G06F 1/1626; G06F 1/1632; G06F 1/1656; G06F 1/1698; H04M 1/0266; H04M 1/72527
See application file for complete search history.

(56) References Cited

U.S. PATENT DOCUMENTS 6,859,219 B1 * 2/2005 Sall ................ G06F 1/1607
345/1.1
8,018,715 B2 * 9/2011 Chang ............ G06F 1/1624
361/679.04
(Continued)

FOREIGN PATENT DOCUMENTS

CN 102637388 B * 12/2013
WO 2014122656 A1 8/2014

*Primary Examiner* — Mehmood B. Khan
(74) *Attorney, Agent, or Firm* — Roberts Calderon Safran & Cole P.C.

(57) ABSTRACT

A combination electronic device is formed from a first device, such as a tablet, and a second device, such as a mobile phone, wherein the display screens of each are combined to display a single integrated image. The first device includes a first display screen having a slot extending from one of its sides that defines a gap in an image displayed by the first display screen. The second device includes a second display screen that is complementary in shape to the gap in the first display screen. A holding mechanism detachably holds the second device such that the second display screen fills the gap of the first display screen of the first device and completes the visual image displayed by the first display screen. A data connection conducts visual display data between the first and second devices such that an image displayed on the second display screen of the second device completes an image displayed on the first display screen of the first device.

19 Claims, 9 Drawing Sheets

Related U.S. Application Data continuation of application No. 14/147,315, filed on Jan. 3, 2014, now Pat. No. 9,939,842.

(60) Provisional application No. 61/748,660, filed on Jan. 3, 2013.

(52) U.S. Cl.
CPC .......... G06F 1/1656 (2013.01); G06F 1/1698 (2013.01); H04M 1/0266 (2013.01); H04M 1/72409 (2021.01)

(56) References Cited

U.S. PATENT DOCUMENTS

| | | | |
|---|---|---|---|
| 8,072,392 B2 | 12/2011 | Lection | |
| 2004/0113865 A1* | 6/2004 | Oku | G06F 1/1601 |
| | | | 345/4 |
| 2004/0135738 A1* | 7/2004 | Kim | G06F 1/1632 |
| | | | 345/1.1 |
| 2007/0010289 A1* | 1/2007 | Mezue | H04M 1/72409 |
| | | | 455/557 |
| 2007/0153456 A1* | 7/2007 | Lin | G06F 1/1616 |
| | | | 361/679.04 |
| 2008/0071473 A1* | 3/2008 | Choi | G01C 21/3667 |
| | | | 701/431 |
| 2009/0138200 A1* | 5/2009 | Hunter | G01C 21/28 |
| | | | 701/472 |
| 2012/0057288 A1* | 3/2012 | Chou | G06F 1/1632 |
| | | | 361/679.09 |
| 2012/0309462 A1* | 12/2012 | Micev | G06F 1/1632 |
| | | | 455/566 |
| 2013/0109371 A1* | 5/2013 | Brogan | G06F 1/1684 |
| | | | 455/420 |
| 2013/0241076 A1* | 9/2013 | Mandlik | H01L 51/52 |
| | | | 257/774 |
| 2013/0250492 A1* | 9/2013 | Wong | G06F 1/1641 |
| | | | 361/679.01 |
| 2014/0349708 A1* | 11/2014 | Ryan | H04N 21/4113 |
| | | | 455/556.1 |
| 2015/0092329 A1* | 4/2015 | Balasundaram | G06F 1/1692 |
| | | | 361/679.09 |
| 2016/0154262 A1* | 6/2016 | Cho | G02F 1/13336 |
| | | | 349/58 |
| 2016/0363291 A1* | 12/2016 | Sun | G02B 19/0023 |

* cited by examiner

ELECTRONIC DEVICE COMBINATION

CROSS-REFERENCES TO RELATED APPLICATIONS

This application is a continuation-in-part of application Ser. No. 15/947,296 filed Oct. 1, 2018 which in turn is a continuation of application Ser. No. 14/147,315 filed Jan. 3, 2014, which in turn claims the benefit of priority of U.S. provisional application No. 61/748,660, filed Jan. 3, 2013. The contents of all of the aforementioned applications are hereby expressly incorporated into this application by reference.

BACKGROUND OF THE INVENTION

The present invention relates to an electronic device combination and, more particularly, to a mobile communication device such as a phone that may be connected to a tablet dock.

Some mobile phones are very large and on the verge of being a tablet. The drawback is that when a manufacturer develops a large phone to give a user a larger viewing area, the device can be considered too heavy, "clunky", or not easily carried by the user. Tablets are similarly caught in the industry-wide struggle of when a device is too small or too large. In general, tablets suffer from mobility issues related to their size. For example, a user cannot easily go for a run with a tablet attached to their arm if they just wanted to listen to music. Furthermore, by using two separate devices a user is burdened by the space required for both including the need for two sets of required and optional accessories. These may include, but are not limited to, separate power plugs and audio listening devices such as headsets. The advent of recent "foldable" digital display devices are also replete with problems: users are still plagued by the weight of a larger tablet computer, even if the unit does transform into a smaller device, and developers struggle to make production cost-effective for the average consumer.

As can be seen, there is a need for an easily combinable tablet and mobile communication device such as a phone.

SUMMARY OF THE INVENTION

In one aspect of the present invention, a combination electronic device comprises: a first device including a first display screen surrounded by an outer edge and having a gap extending from the outer edge that defines a gap in an image displayed by the first display screen; a second device including a second display screen that is complementary in shape to the gap in the first display screen; a holding mechanism that detachably holds the first and second devices together such that the second display screen of the second device fills the gap of the first display screen of the first device, to complete the visual image displayed by the first display screen, and a data connection that conducts visual display data between the first and second devices such that an image displayed on the second display screen of the second device completes an image displayed on the first display screen of the first device.

Preferably, the gap in the first display screen of the first device has parallel sides. More preferably, this gap is U-shaped and defined by a U-shaped slot in the first device, and the holding mechanism holds the second device in the U-shaped slot of the first device such that the second display screen is co-planar with the first display screen. In such an embodiment, the combination electronic device preferably further comprises a transparent sheet of material overlying the first display screen of the first device that suppresses the perception of borders between the first display screen and second display screen. Additionally, the holding mechanism may be a pocket formed by the transparent sheet that overlies the first display screen of the first device, sides of the U-shaped slot in the first device, and a wall at a side of the first device that is opposite to the first display screen.

Alternatively, the holding mechanism may hold the second display screen of the second device either over or under the U-shaped slot of the first device.

Each of the first and second devices may include a microprocessor for generating an image on their respective screens, one or both of the microprocessors of the first and second devices may be programmed to suppress perception of borders between the first display screen and second display screen when the holding mechanism holds the second device in the U-shaped slot of the first device.

Preferably, one or both of the first and second display screens are borderless screens that suppress the perception of borders between the first display screen and second display screen when the second display screen fills the U-shaped gap of the first display screen. Such borderless screens may include a refractive lens material that refracts the visual image over the edge of one or both of the first and second display screens.

In another aspect of the present invention, a combination electronic device comprises: a first device comprising a first display screen and a U-shaped docking slot, wherein the U-shaped docking slot comprises an inner rim comprising an input and one of a male and female component; a second device comprising a second display screen and an outer rim, wherein the second device is formed to fit within the U-shaped docking slot, and wherein the outer rim comprises an output and one of a male and female component interfereably complementary of the inner rim, wherein the male and female components of the inner rim and the outer rim releasably engage one another connecting the output to the input, thereby releasably attaching the second device to the first device, wherein the first display screen and the second display screen are aligned along the same plane when the first device and the second device are connected, thereby forming an overall display screen.

The first device may be any electronic device with a screen larger than the second device. In one preferred embodiment the first device is an electronic tablet and the second device is a mobile communication device such as a phone. However, the second device may also be, for example, an electronic device that takes and/or records scientific measurements.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a combination of a first device and a second. The first device may include a tablet dock and the second device may include a phone. The tablet dock may include a docking slot with an inner rim and an input. The mobile communication device such as a mobile phone may be sized to fit within the docking slot and may include an outer rim that slidably engages and releasably attaches to the inner rim. The outer rim may include an output that connects with the input. Therefore, when the phone is docked within the docking slot, a full sized tablet may be activated using data from the phone.

The present invention may allow two devices to combine with one another to form a single unit tablet. Further, the present invention may allow a user to separate the devices to use as a mobile communication device such as a mobile phone. In such embodiments, the mobile phone may neither be too large or cumbersome to use and a tablet device may not be too small because a user may use the phone separately or combine the devices to use as a tablet. Further, the invention eliminates the need for separate power plugs since the tablet device may charge the phone either from an independent internal battery or from a single wall plug that is used when the device is unified or separate. Further, when the phone is docked into the tablet, a user may also be able to plug in headphones to the tablet to allow the user to enjoy a conversation across a cellular network while at the same time enjoying the convenience of viewing a larger screen.

The present invention provides a unified tablet device and mobile phone. The unified device may save space in that it may not require two standalone devices nor would it require two charging cords as the mobile phone may charge while docked with the tablet device or may be directly hooked up to an AC adapter. The device may further save money since the user may not need separate cellular commitments because the user may make cellular calls using cellular networks when the mobile phone is docked.

The present invention, when mechanically unified, may also facilitate data exchange between the two devices. Once this occurs an added benefit is that data can be exchanged. This may include, but are not limited to, a user wishing to sync music playlists, photographs, and documents from their tablet to their mobile phone. Once the devices are disconnected, both can be up to date with recent additions from the other device.

Referring now to FIGS. 1 through 6, a first embodiment of the device may include a first device and a second device. The first device may be tablet dock 10 and the second device may be a mobile phone 24. The tablet dock 10 may include a docking slot 12 which in this embodiment is U-shaped. The docking slot 12 may include an inner rim having a first side, a second side, and an inner end. A data connection 13 is provided between the tablet dock 10 and mobile phone 24 for conducting visual display data between the two devices. In the present embodiment, the data connection 13 includes a tablet port 14 provided at the inner end of the docking slot, and a phone port 26. The tablet port 14 may be a male port that connects with the phone 24 via the phone port 26, which is female. When connected, the tablet dock 10 may display an output of the phone 24 on the tablet screen 20 and phone screen 30 to provide an overall display screen 22.

A holding mechanism 15 is provided to detachably hold the tablet dock 10 and mobile phone 24 together such that the phone screen 30 fills in the gap in the tablet screen 20 caused by the U-shaped docking slot 12. In this embodiment, the holding mechanism 15 includes one of a male and female component located on the inner rim of the docking slot 12, one of a male and female component located on the sides of the mobile phone 24, a latch 44 located on the inner rim of the docking slot 12, and a lock latch slot 46 located on a top end of the mobile phone 24. The one of the male and female component may include a dock rail 16 located on the two sides of the inner rim of the docking slot 12. In certain embodiments, the dock rail 16 may include protruding ridges. The docking slot 12 may further include the latch 44. The latch 44 may also be located at the end of the docking slot 12. In certain embodiments, the latch 44 may be spring loaded. The latch 44 may be used to secure the phone 24 to the tablet dock 10. The tablet dock 10 may further include a tablet bezel 18 that matches a phone bezel 36 of the phone. In a different embodiment, the docking slot 12 includes a magnet or other magnetic material as substitute for a locking latch system to secure the phone 24 in place. In certain embodiments, the phone 24 may be sized to fit within the docking slot 12 of the tablet dock 10. The phone 24 may include an outer rim that may include a first side, a second side, a top end and a bottom end. The top end of the phone 24 may include an output, such as a phone port 26. The phone port 26 may be used to charge the phone. Further, the phone port 26 may transfer data to the tablet dock 10 when connected to the input. In certain embodiments, the phone port 26 is a female port that may receive the tablet port 14.

The top end of the phone 24 may further include a lock latch slot 46 to receive and lock with the locking latch 44 of the tablet dock 10. The phone 24 may further include a lock switch 32. The lock switch 32 may be on the back of the phone 24 and may control the lock latch slot 46. The outer rim of the phone 24 may include one of a male and female component. For example, the two sides of the phone 24 may include a rail 28. The rail 28 may include receiving channels. The receiving channels may receive the protruding ridge of the dock rail 16. As mentioned above, the phone 24 may further include an attachment piece such as a magnet or other magnetic material as substitute for or used with the locking latch 46 and lock switch 32.

Figure 1:
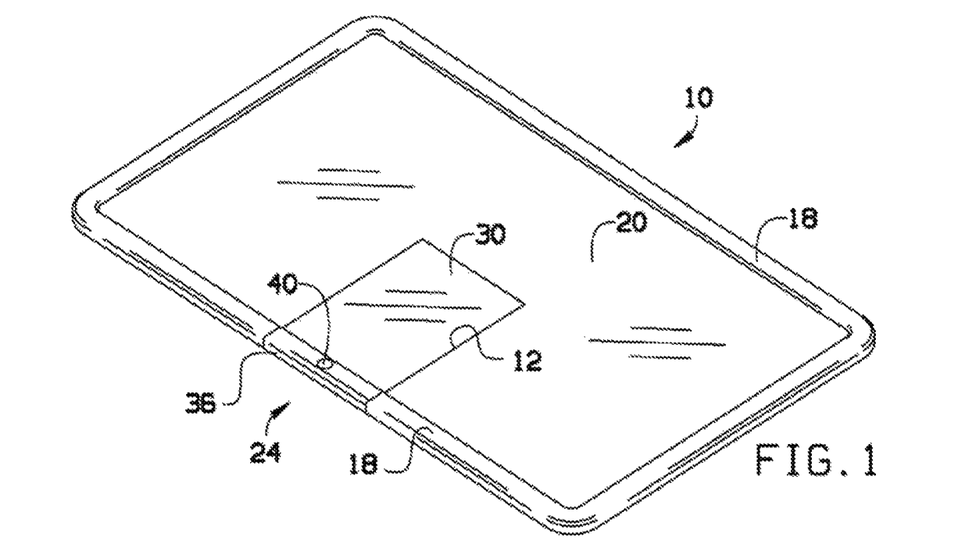
FIG. 1 is a perspective view of a first embodiment of the present invention.
Figure 2:
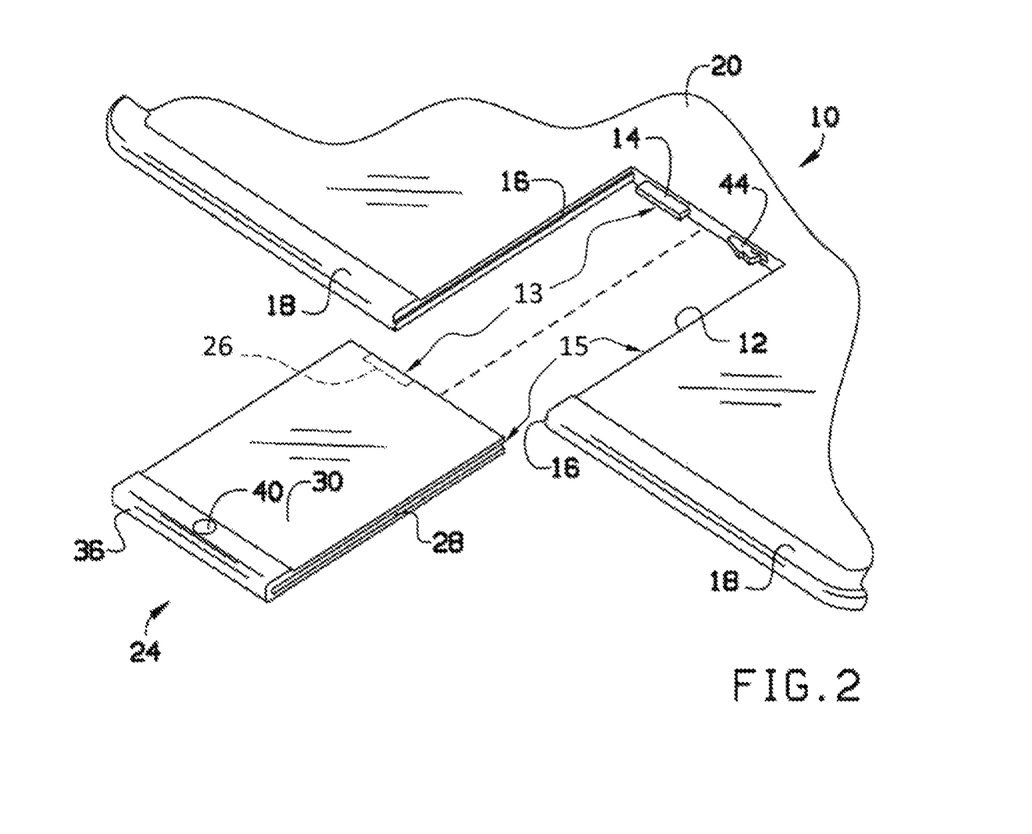
FIG. 2 is a detail exploded view of the embodiment of FIG. 1.
Figures 3A, 3B, 4, 5:
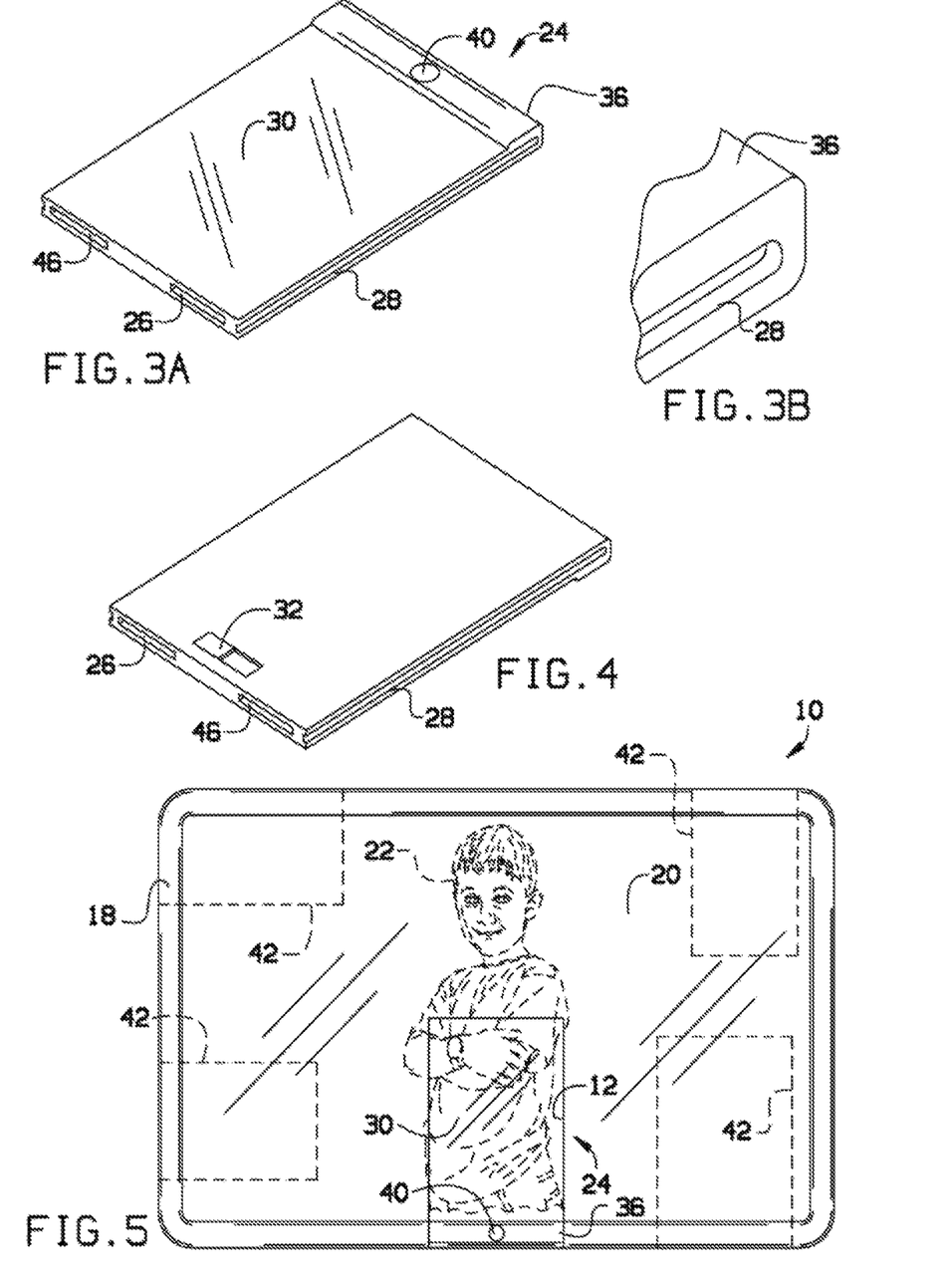
FIG. 3A is a perspective view of the first embodiment with the phone of FIG. 1 rotated 180 degrees.
FIG. 3B is a detailed view of the channel of FIG. 3A.
FIG. 4 is a back view of the phone of FIG. 1 rotated 180 degrees.
FIG. 5 is a top view of the first embodiment shown in assembled configuration.
Figure 6:
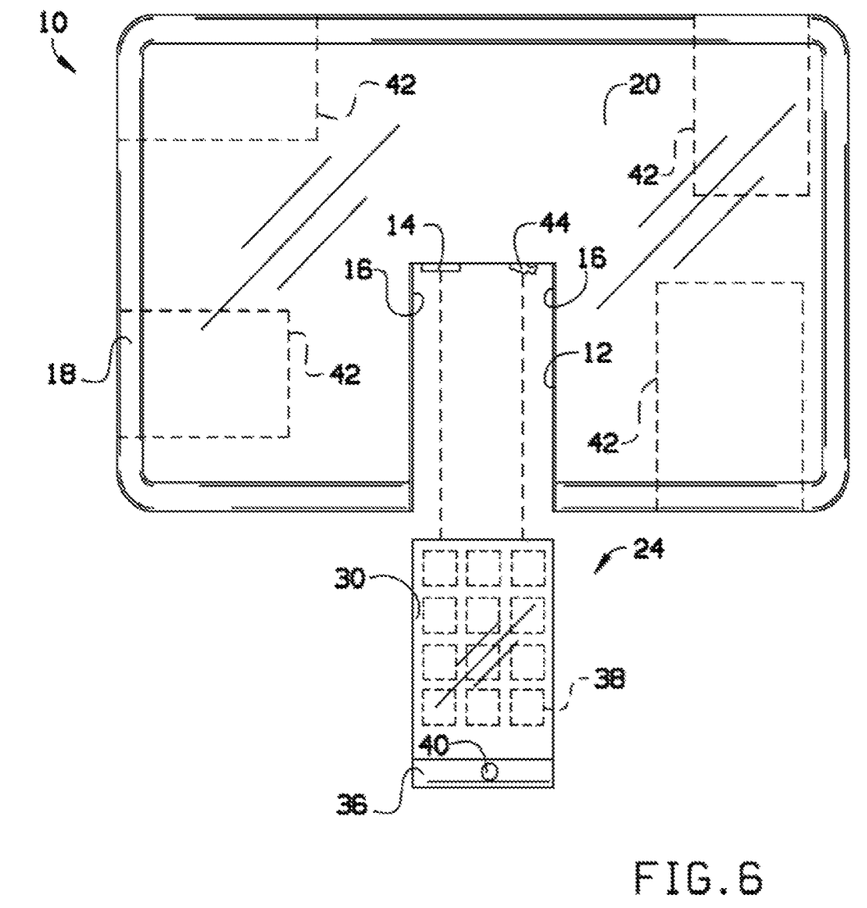
FIG. 6 is an exploded view of the first embodiment of the invention.
Figure 7:
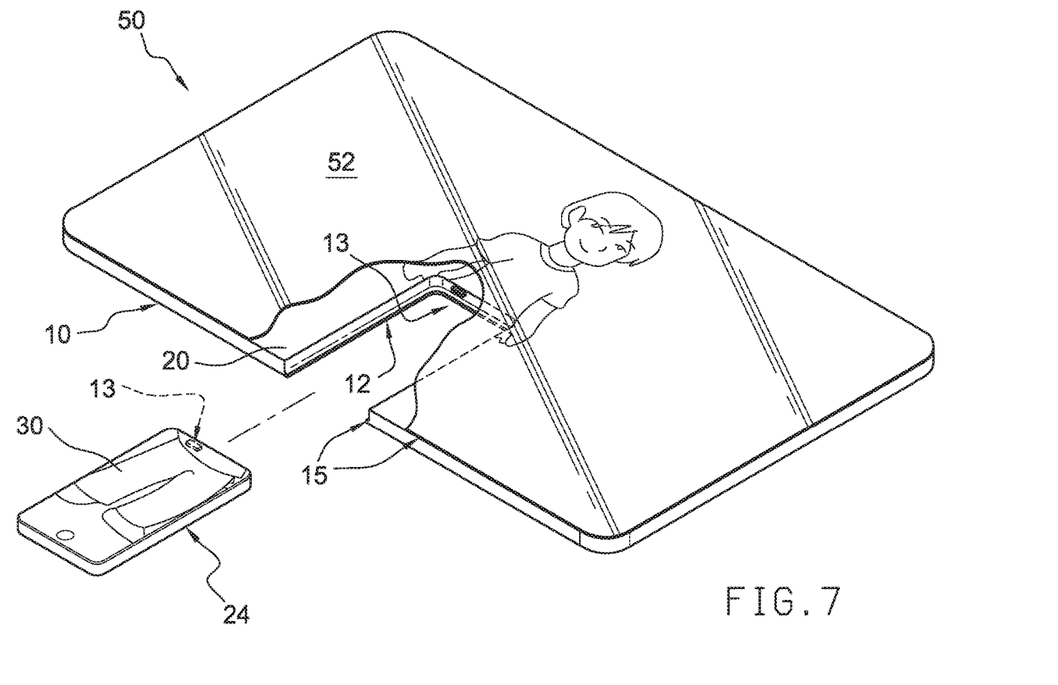
FIG. 7 is an exploded perspective view of a second embodiment of the invention.
Figure 8:
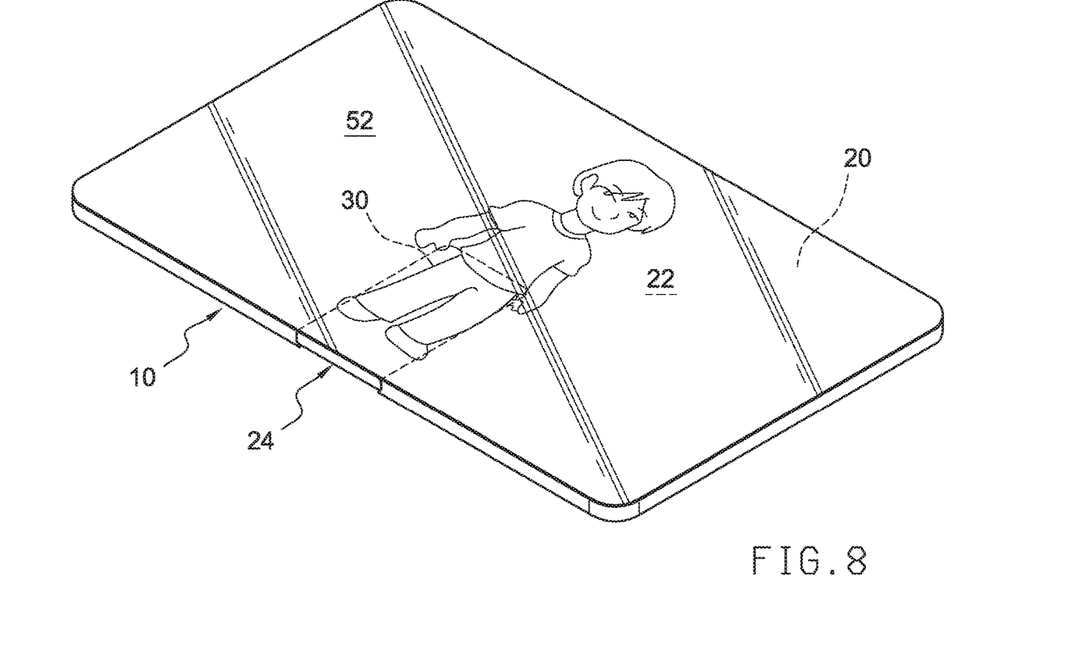
FIG. 8 is a perspective view of the second embodiment of the invention shown in FIG. 7 in an assembled state.
Figure 9:
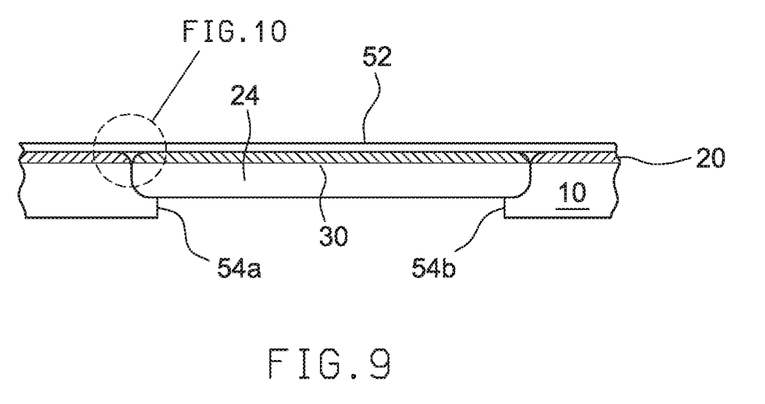
FIG. 9 is a bottom side view of the second embodiment taken along the line 9-9 in FIG. 8.

The front of the phone may include a phone screen 30 and the phone bezel 36 at the bottom of the phone 24. The bezel 36 may include a camera 40. However, a camera 40 may also be placed on the back of the phone 24. The mobile phone 24 may not have a plastic border separation other than the bezel 36 on the bottom. The tablet dock 10 screen and the phone 24 screen are aligned along the same plane when the tablet dock 10 and the phone 24 are connected. Therefore, when attached to the tablet dock 10, the phone 24 may be seamless with the tablet dock 22 and provide one large tablet screen display 22. As illustrated in FIG. 5, the docking slot 12 may be in multiple locations.

In use, the phone 24 may be used separately as a mobile device. However, if the user would like to use the phone 24 as a tablet with a larger screen, the user may insert the phone 24 into the tablet docking slot 12. The dock rail 16 may match up with the phone rail 28, i.e. the receiving channel may receive the protruding ridge. The user may snap the phone 24 into the tablet docking slot 12. This may be done by engaging the phone port 26 and the lock latch slot 46 of the phone 24 with the tablet port 14 and latch 44 of the tablet docking slot 12. Once the lock switch 32 has engaged the latch 44, the phone 24 may be secured within the tablet docking slot 12 and the device may be used as a tablet. To disengage the phone 24 from the tablet dock 10, the user may activate the lock switch 32. The lock switch 32 may include a slide lock, button or the like.

With reference now to FIGS. 7-10, wherein like numerals designate like components, a second embodiment 50 of the combined electronic device of the invention includes a holding mechanism 15 formed from a clear or translucent sheet 52 of material over lying the tablet screen 20 as shown, in combination with a pair of retaining ribs 54a, 54b located at the bottom side portions of the slot 12. The clear or translucent sheet 52 of material over lying the tablet screen 20 serves the dual function of retaining the mobile phone in the slot 12 of the tablet dock 10 while also suppressing the perception of a border between the tablet screen 20 and the phone screen 30. The use of retaining ribs 54a, 54b located at the bottom side portions of the U-shaped slot 12 that overlie the sides of the mobile phone 24 obviates the need for special rails or slots to be incorporated into the sides of the mobile phone 24. The retaining ribs 54a, 54b are preferably formed from a resilient plastic material so that the U-shaped slot can receive mobile phones 24 having different thicknesses.

The second embodiment 50 further includes a data connection 13 which may be formed from a male tablet port 14 and female phone port 26 for conducting visual display data between the two devices as in the first embodiment. Alternatively, the data connection 13 in this embodiment may be a wireless connection between the two devices that obviates the need for any such protruding or recessed ports, sockets, or connectors that need to come into mechanical contact with one another. In the context of this application, the term "wireless connection" is not confined to a radio-wave type connection, but also includes a connection made via any frequency of electromagnetic radiation, including light, whether visible or infrared or ultraviolet. The data connection 13 can also be consolidated with a power connection to conduct electric power from the tablet dock 10 to the mobile phone 24 and vice-versa.

Figure 10:
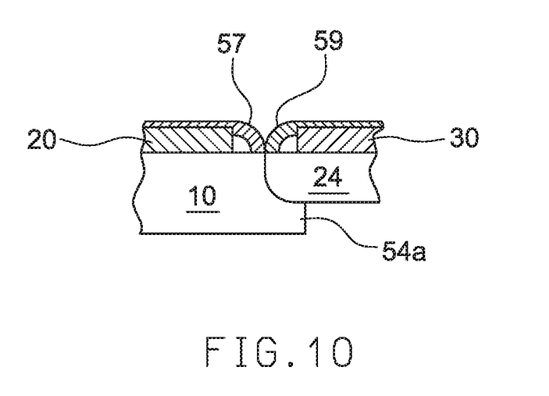
FIG. 10 is an enlarged, partial cross-sectional view of the area circled in phantom in FIG. 9.

Preferably, the screens 20, 30 of the tablet dock 10 and mobile phone 24 both employ "borderless" screen technology to further suppress the perception of a border between these two screens 20, 30 when they are combined to form the overall display screen 22. Examples of such borderless screen technology are present in the descriptions of both U.S. Pat. No. 9,568,800 and US2018/0205809, the disclosures of which are hereby expressly incorporated herein. In the technology described in U.S. Pat. No. 9,568,800, the phone screen is surrounded by a light-conductive plastic in the shape of a quarter-round that acts like a cylindrical lens and refracts the image projected by the screen over the edges of the screen. If such cylindrical lenses 57, 59 are provided around the edges of the slot 12 of the tablet screen 20 and around the outer edges of the phone screen 30 as shown in FIG. 10, the images projected by the tablet screen 20 and phone screen 30 should abut or slightly overlap, thus erasing what would otherwise be perceived as a dark, U-shaped line between the two screens 20, 30. The perception of a border between the two screens can be further suppressed by programming the microprocessors present in tablet dock 10 and mobile phone 24 with anti-distortion software which "weaves" the images at the border of the screens 20, 30 together to appear as a single, continuous image.

Figure 11A:
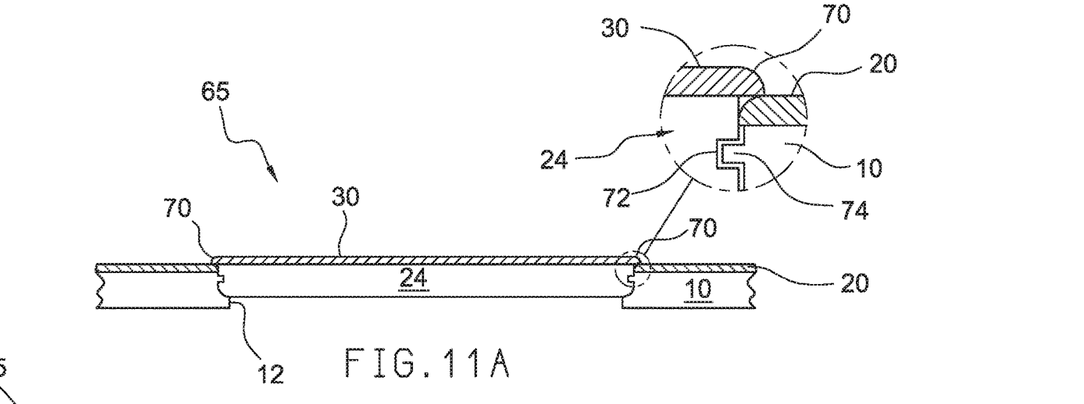
FIGS. 11A and 11B are a bottom side view and a plan view of a third embodiment of the invention.
Figure 11B:
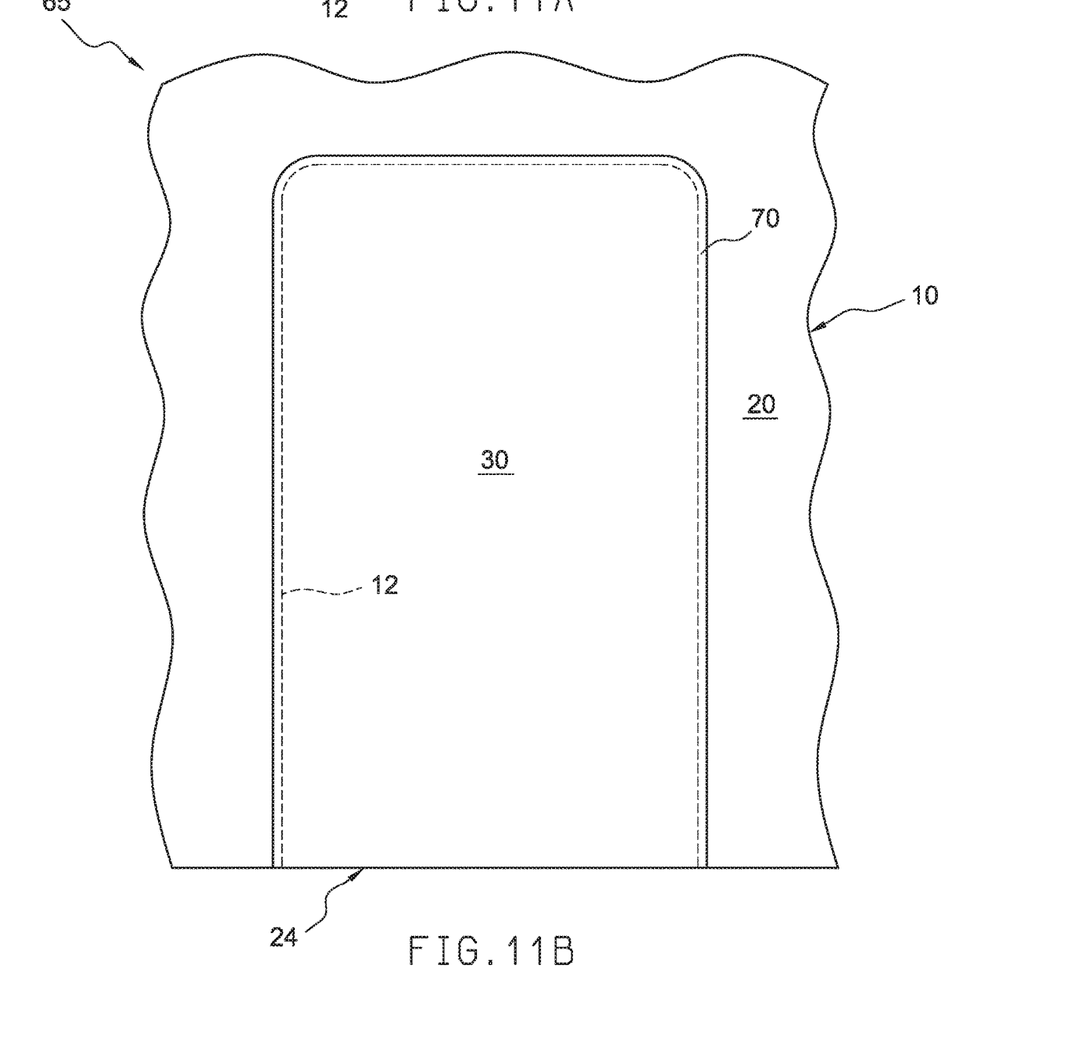

FIGS. 11A and 11B illustrate a third embodiment 65 of the invention. In this embodiment 65, the mobile phone 24 includes a screen 30 having slightly extended outer edges 70 fabricated in accordance with the borderless technology described in the previously-mentioned U.S. Pat. No. 9,568,800, the only difference being that the cylindrical lenses 57, 59 shown in FIG. 10 are slightly extended beyond the side walls of the body of the mobile phone 24. These extended outer edges 70 advantageously overlie the outer edges of tablet screen 20 above the slot 12 of the docking tablet 10. The holding mechanism 15 of the third embodiment 65 includes longitudinal recesses 72 that extend along the sides of the mobile phone 24 and complimentary-shaped rails 74 that extend along the sides of the slot 12. In use, the recesses 72 of the mobile phone 24 are aligned with the rails 74 of the docking tablet 10 and the mobile phone 24 is slid into the slot 12 of the docking tablet 10 into position illustrated in FIG. 11B such that the extended outer edges 70 of the mobile phone screen 30 closely overlap the inner edges of the tablet screen 20 bordering the slot 12. While such an overlapping configuration is presently not preferred over the previously-discussed second embodiment 50 wherein the screens 20 and 30 are coplanar, it will increase in desirability as both phones and tablets become thinner with the advanced technology of the future.

Figure 12A:
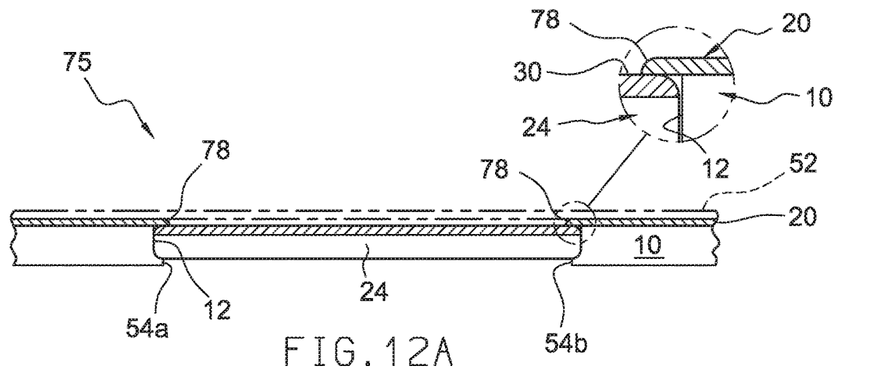
FIGS. 12A and 12B are a bottom side view and a perspective exploded view of a fourth embodiment of the invention.
Figure 12B:
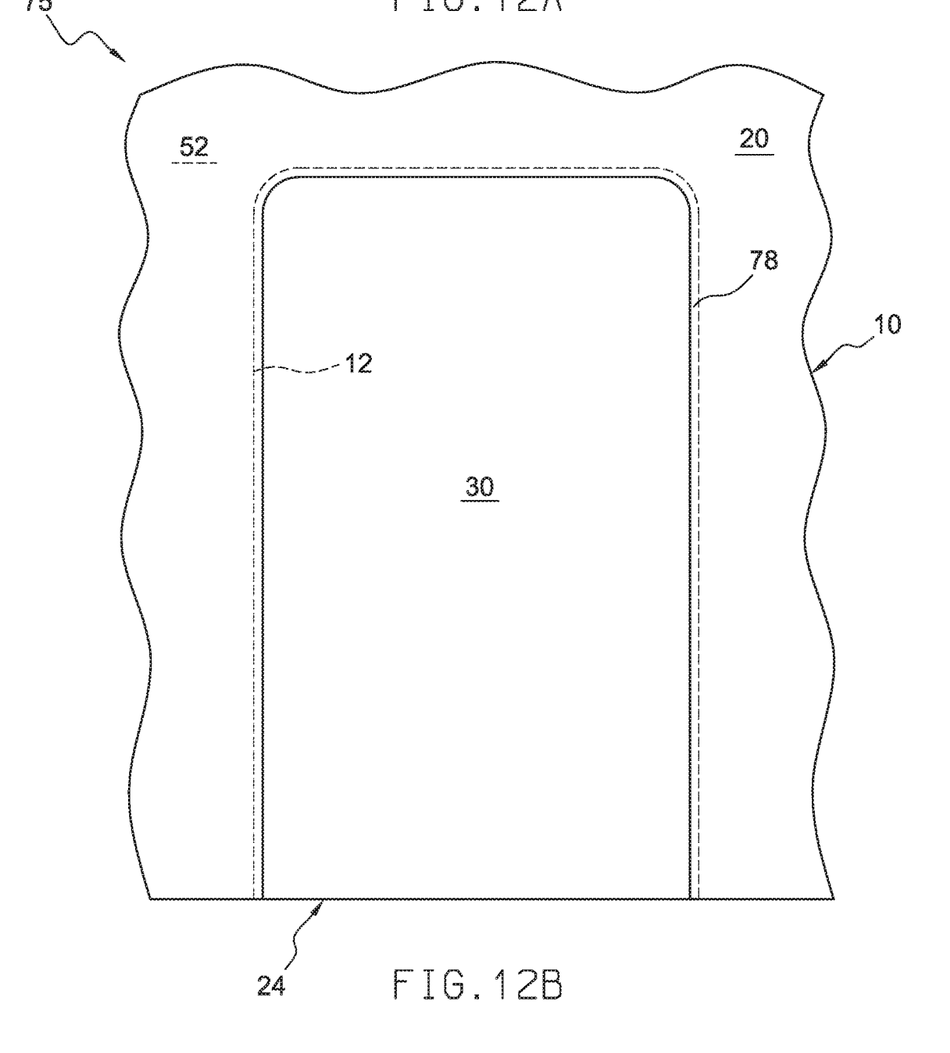

FIGS. 12A and 12B illustrate a fourth 75 embodiment of the invention. In this embodiment 75, the mobile phone 24 underlies the slot 12 of the docking tablet 10. The holding mechanism 15 includes the ribs 54a, 54b described with respect to the second embodiment 50 illustrated in FIGS. 7-10, and may optionally include the overlying sheet 54 of clear or translucent material as indicated in phantom. This embodiment 75 has the advantage that only the tablet screen 20 needs to include the "borderless" technology discussed earlier, although such borderless technology may optionally be used in connection with the mobile phone 24 if desired. Again, while such an overlapping configuration is presently not preferred over the previously-discussed second embodiment 50 wherein the screens 20 and 30 are coplanar, it will increase in desirability as both phones and tablets become thinner with the advanced technology of the future.

Figure 13A:
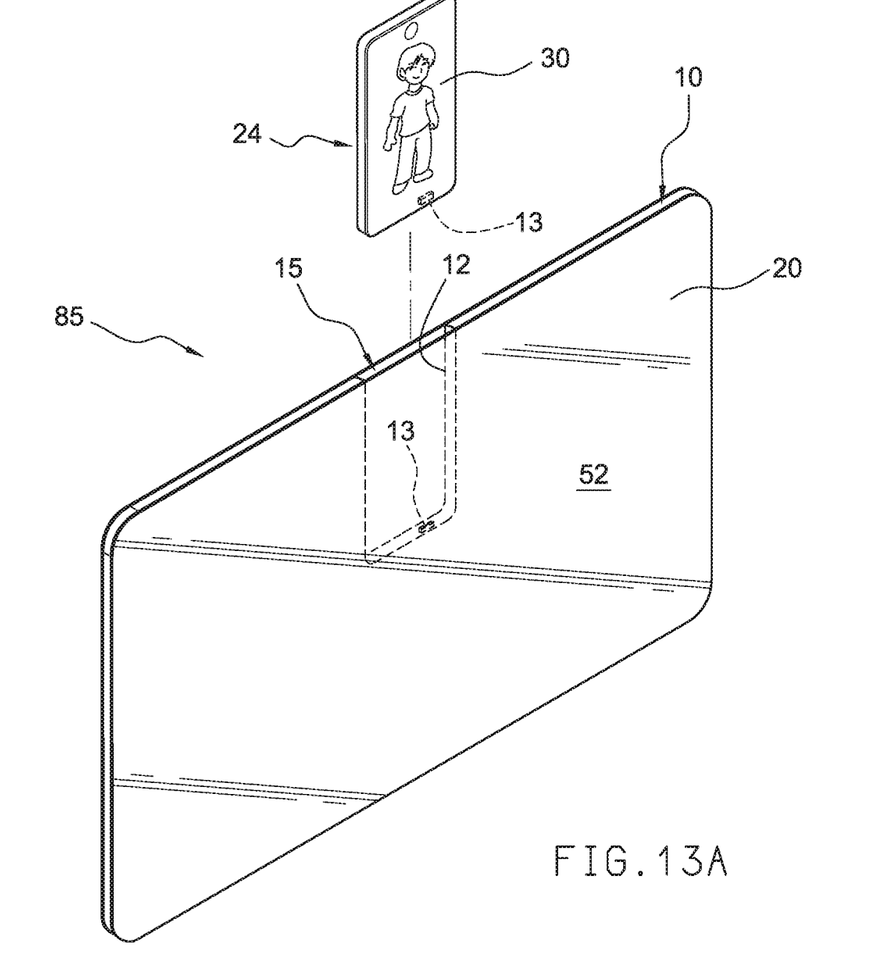
FIGS. 13A, 13B, and 13C are an exploded view, a top side view, and a perspective view of a fifth embodiment of the invention.
Figure 13B:
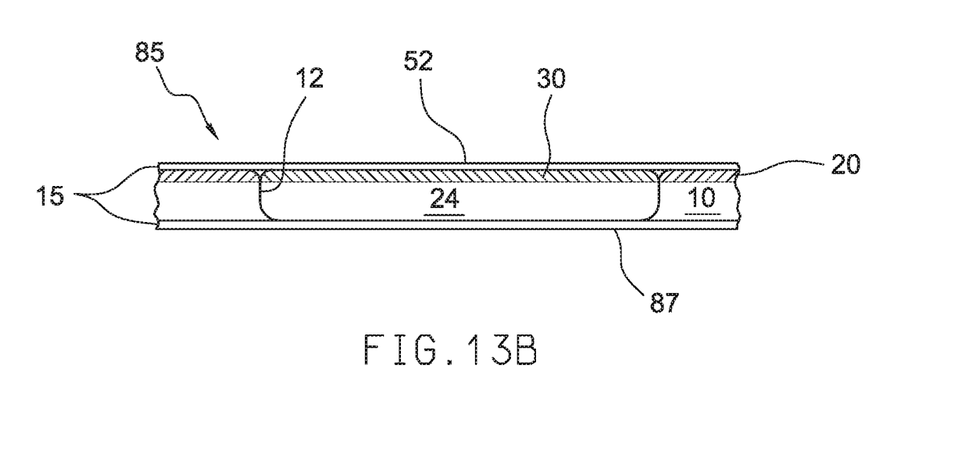

FIGS. 13A and 13B illustrate a fifth embodiment 85 of the invention that is similar to the second embodiment 50, with the exception that a second sheet of material 87 (which may or may not be transparent of translucent) overlies the back wall of the docking tablet such that the holding mechanism 15 comprises a "drop pocket" 90 formed from the clear or translucent sheet 52, the sides of the slot 12 of the docking tablet 10, and the sheet of material 87.

Figure 13C:
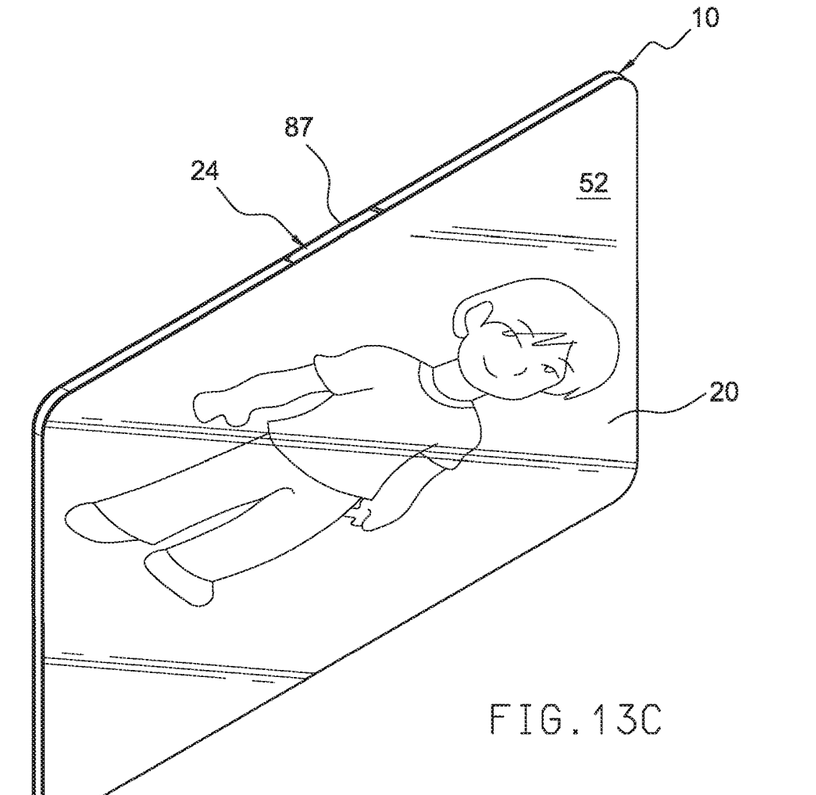
Figure 14:
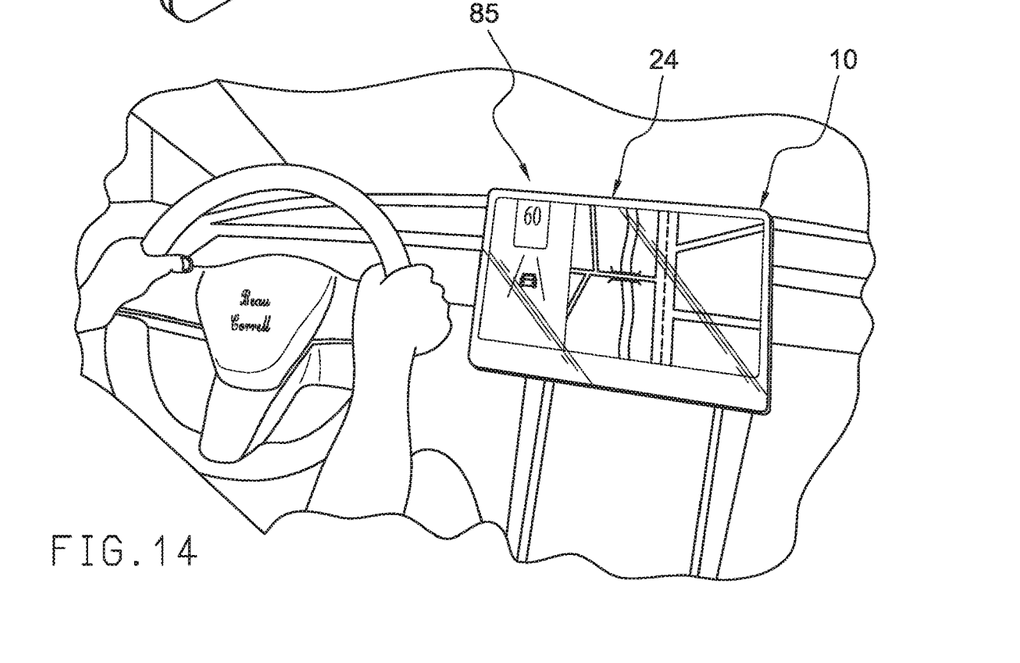
FIG. 14 is a perspective view of the fifth embodiment of the invention mounted onto the dashboard of a motor vehicle.

FIG. 14 illustrates the use of the fifth embodiment 85 of the invention on the dashboard of a motor vehicle. Here, docking tablet 10 functions to enlarge the screen 30 of the mobile phone 24 when the GPS app of the mobile phone 24 is in use in the same manner that the image of the boy on the mobile phone screen 30 in FIG. 13A is enlarged in FIG. 13C when the mobile phone 24 is dropped into the pocket-like holding mechanism 15 of the docking tablet 10. This is a particularly useful application of the fifth embodiment 85 of the invention as it provides an inexpensive retrofit of a dashboard-installed GPS guidance system for an automotive vehicle which is in many ways superior to a factory installed GPS guidance system, as such mobile phones and the GPS apps that they provide are constantly improving whereas the programming and capabilities of dashboard-installed GPS guidance systems often remain static throughout the lifetime of the vehicle.

In certain embodiments, a user may want to use a mobile phone to take with them on the go. In the event that the mobile phone is charged to the satisfaction of the user, the user may unlock and slide te phone out. At that point, the tablet could power down and/or attached to a charging mechanism. Due to a phone being too small for major word-processing tasks, the use may later push the phone into place and form a unified tablet. In addition to the ability to make and receive phone calls from the unified device, the user may also compose word documents or engage in other activities that are more suited to a tablet than a mobile phone.

While the electronic device combination is the combination of a tablet and a mobile phone in the preferred embodiment, the invention is not confined to such combinations. The first device may also be, for example, the display screen on a vehicle dashboard, a television screen, or a computer display. The second device may be a tablet or any other electronic device having a screen smaller than the screen of the first device. One or both of the screens of the first and second devices may be transparent such as a transparent, organic light-emitting diode (or OLED) screen.

It should be understood, of course, that the foregoing relates to exemplary embodiments of the invention and that modifications may be made without departing from the spirit and scope of the invention as set forth in the following claims.

The invention claimed is:

1. A combination electronic device comprising:
a first device including a first display screen surrounded by an outer edge and having a U-shaped gap extending from the outer edge that defines a gap in an image displayed by the first display screen;
a second device including a second display screen that is complementary in shape to the gap in the first display screen, and
a holding mechanism configured to hold the first and second devices together such that the second display screen of the second device fills the gap of the first display screen of the first device, to complete the visual image displayed by the first display screen,
wherein the gap in the image of the first display screen is defined by a U-shaped slot in the first device having parallel sides, and
wherein the image displayed by the first display screen borders at least one of the parallel sides of the U-shaped gap.

2. The combination electronic device defined in claim 1, further comprising a transparent material overlying the first display screen of the first device that suppresses the perception of borders between the first display screen and second display screen.

3. The combination electronic device defined in claim 1, wherein one or both of the first and second display screens are borderless screens that suppress the perception of borders between the first display screen and second display screen when the second display screen fills the gap of the first display screen.

4. The combination electronic device defined in claim 1, wherein the second display screen is a borderless screen having edges that extend beyond sides of the second device and which overlie edges of the first display screen of the first device when the second display screen of the second device fills the gap of the first display screen of the first device such that the perception of borders between the first and second screens is suppressed.

5. The combination electronic device defined in claim 1, wherein the first display screen is a borderless screen having edges that extend beyond sides of the gap of the first device and which overlie edges of the second display screen of the second device when the second display screen of the second device fills the gap of the first display screen of the first device such that the perception of borders between the first and second screens is suppressed.

6. The combination electronic device defined in claim 1, wherein the first device is a tablet and the second device is a mobile phone.

7. The combination electronic device defined in claim 1, wherein one or both of the first and second screens are transparent.

8. The combination electronic device defined in claim 1, wherein the first device is a dashboard screen of a vehicle and the second device is a mobile phone.

9. The combination electronic device defined in claim 1, wherein the gap in the first display screen includes parallel sides.

10. The combination electronic device defined in claim 9, wherein the gap in the first display screen is U-shaped.

11. The combination electronic device defined in claim 2, wherein the transparent material is a transparent or translucent sheet.

12. A combination electronic device comprising:
a first device including a first display screen surrounded by an outer edge and having a U-shaped gap having parallel sides extending from the outer edge that defines a gap in an image displayed by the first display screen, and
a microprocessor for generating an image on the first display screen,
the U-shaped gap being defined by a U-shaped slot in the first device;
a second device including a second display screen that is complementary in shape to the U-shaped gap in the first display screen, and
a microprocessor for generating an image on the second display screen;
a holding mechanism configured to detachably hold the second device in the U-shaped slot of the first device such that the second display screen of the second device fills the U-shaped gap of the first display screen of the first device and completes the visual image displayed by the first display screen, and a data connection that conducts visual display data between the processors of the first and second devices such that an image displayed on the second display screen of the second device completes an image displayed on the first display screen of the first device, wherein the image displayed by the first display screen borders at least one of the parallel sides of the U-shaped gap.

13. The combination electronic device defined in claim 12, further comprising a transparent sheet of material overlying the first display screen of the first device that suppresses perception of borders between the first display screen and second display screen.

14. A combination electronic device comprising:

a first device including a first display screen surrounded by an outer edge and having a U-shaped gap having parallel sides extending from the outer edge that defines a gap in an image displayed by the first display screen, and a microprocessor for generating an image on the first display screen, the U-shaped gap being defined by a U-shaped slot in the first device;

a second device including a second display screen that is complementary in shape to the U-shaped gap in the first display screen, and a microprocessor for generating an image on the second display screen;

a holding mechanism configured to detachably hold the second device in the U-shaped slot of the first device such that the second display screen of the second device fills the U-shaped gap of the first display screen of the first device and completes the visual image displayed by the first display screen, and a data connection that conducts visual display data between the processors of the first and second devices such that an image displayed on the second display screen of the second device completes an image displayed on the first display screen of the first device wherein one or both of the microprocessors of the first and second devices are programmed to suppress perception of borders between the first display screen and second display screen when the holding mechanism holds the second device in the U-shaped slot of the first device.

15. The combination electronic device defined in claim 12, wherein one or both of the first and second display screens are borderless screens that suppress the perception of borders between the first display screen and second display screen when the second display screen fills the U-shaped gap of the first display screen.

16. The combination electronic device defined in claim 15, wherein the borderless screen of one or both of the first and second display screens includes a refractive lens material overlying an edge of one or both of the first and second display screens that refracts the visual image over the edge of one or both of the first and second display screens.

17. A combination electronic device comprising:

a first device including a first display screen surrounded by an outer edge and having a U-shaped gap extending from the outer edge that defines a gap in an image displayed by the first display screen;

a second device including a second display screen that is complementary in shape to the gap in the first display screen, and a holding mechanism configured to hold the first and second devices together such that the second display screen of the second device fills the gap of the first display screen of the first device, to complete the visual image displayed by the first display screen, wherein the gap in the image of the first display screen is defined by a U-shaped slot in the first device having parallel sides that are spaced apart from sides of the first display screen.

18. The combination electronic device defined in claim 17, wherein the image displayed by the first display screen borders both parallel sides of the U-shaped gap.

19. A combination electronic device comprising:

a first device including a rectangular first display screen surrounded by an outer edge and having a gap extending from the outer edge along an axis that defines a gap in an image displayed by the first display screen;

a second device including a second display screen that is complementary in shape to the gap in the first display screen, and a holding mechanism configured to hold the first and second devices together such that the second display screen of the second device fills the gap of the first display screen of the first device, to complete the visual image displayed by the first display screen, and wherein the image displayed by the first display screen surrounds the edges of the gap.

* * * * *